June 20, 1967 C. A. TUCKER 3,326,260
SELF-LOCKING, SELF-TAPPING NUT
Filed March 22, 1965
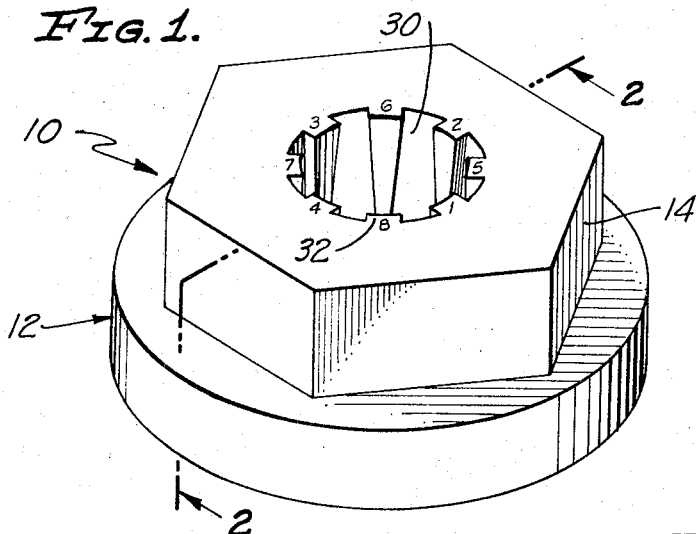
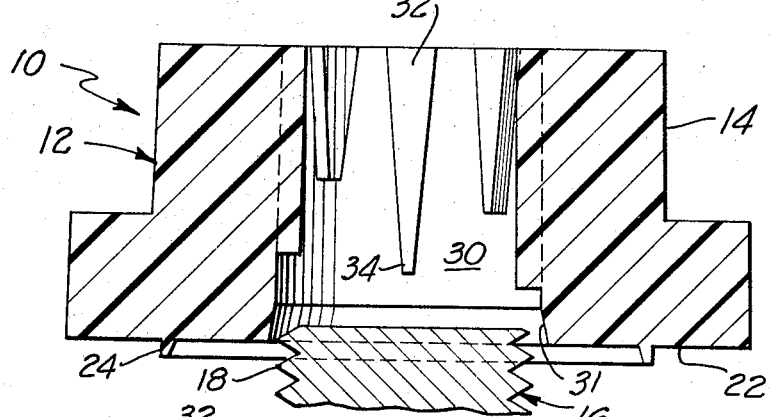
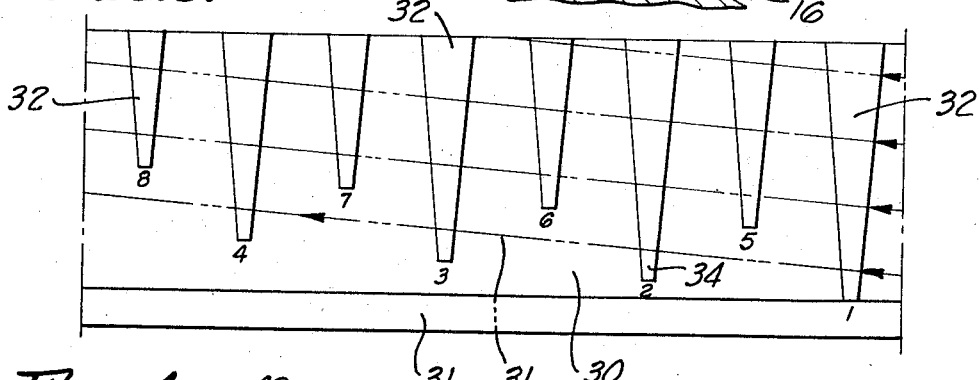
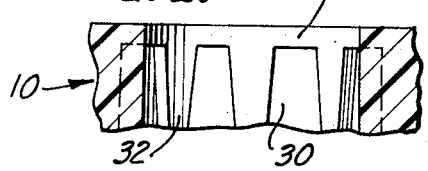
INVENTOR.
COUNCIL A. TUCKER
BY
THOMAS P. MAHONEY
ATTORNEY United States Patent Office 3,326,260
Patented June 20, 1967

3,326,260
SELF-LOCKING, SELF-TAPPING NUT
Council A. Tucker, Glendale, Calif., assignor of forty percent to Theodore Chester Neward, Pomona, Calif., and twenty percent to Thomas P. Mahoney, Malibu, Calif.
Filed Mar. 22, 1965, Ser. No. 441,620
8 Claims. (Cl. 151—7)

This invention relates to a self-locking, self-tapping and self-sealing nut, which is intended particularly for low tensile applications and which is designed to be molded, or otherwise formed, from suitable displaceable or extrudable materials in one piece.

There are many applications in industry where the utilization of self-locking nuts is indicated. In many of these applications, the use of conventional self-locking nuts or conventional nuts in association with a face washer and a locking washer is prohibitively expensive and not necessary because the conventional nuts are capable of being subjected to far greater tensile loads than the application necessitates.

The cost of the components of a conventional metallic nut utilized in conjunction with a face washer and a locking washer is, as stated above, frequently too high for the application in which the combination is to be utilized. However, conventional metallic nuts of the self-locking type which incorporate various types of self-locking expedients are frequently more expensive than the conventional face washer, lock washer, metallic nut combination.

Consequently, there is a need for a low cost self-locking nut which is particularly adaptable for low-tensile applications, and which operates in a self-locking manner without the incorporation of auxiliary components customarily utilized in conventional self-locking nuts.

It is, therefore, an object of my invention to provide a self-locking, self-tapping nut adapted for low-tensile applications and fabricated from a material such as one of the synthetic plastics or readily extrudable or deformable metal of the nature of aluminum or zinc. A typical synthetic plastic which has been utilized in fabricating nuts in accordance with the teachings of the invention is nylon.

Another object of my invention is the provision of a nut of the aforementioned character which includes a body having a bore extending axially thereof with the wall of the bore incorporating a plurality of spaced, axially extending ribs whose lower extremities are disposed at progressively greater distances from the lower extremity of the bore to define a desired lead or pitch angle conforming to the lead or pitch angle of a screw to be utilized in conjunction with said nut.

Therefore, as the nut is inserted into the bore, the thread thereof will progressively engage the lower extremities of successive ribs and, since the nut body is formed of deformable, extrudable and relatively soft material, the thread of the screw will self tap the ribs and provide a pattern in the successive ribs delineating intermittent portions of a thread pattern conforming to the thread pattern of said nut.

Another object of my invention is the provision of a nut having a plurality of axially extending spaced ribs formed on the wall of its bore, said ribs being tapered from the lower to the upper extremities thereof to provide gradually increasing, greater areas of engagement as the screw penetrates the bore of the nut. Consequently, the force entailed in the initial application of the screw to the nut, or the nut to the screw, is significantly smaller than that entailed in the ultimate seating of the greater portion of the shank of the screw in the bore of the nut.

An additional object of my invention is the provision of a nut of the aforementioned character wherein the aforesaid ribs taper inwardly toward the axis of the bore of the nut progressively from the lower to the upper extremities of the ribs. Therefore, the lower extremities of the ribs define a major diameter for the reception of the extremity of the shank of an associated screw while the upper extremities of said ribs define a minor diameter whose dimension is determined by the taper imparted to the confronting surfaces of the cooperating ribs.

As a result of the cooperating tapers imparted to the ribs, the thread of the cooperating screw gradually encounters successively greater areas and depths of rib. As a result, the depth of the thread segment and the width thereof formed by the thread of the screw in the ribs as it advances into the bore become gradually greater, thus increasing the tenacity with which the nut will lock upon the thread of the screw.

Another object of my invention is the provision of a nut of the aforementioned character which incorporates an integral seal in said bore cooperative with the shank of the screw in said bore to seal said bore against the infiltration of fluid through said bore and past said shank.

Another factor contributing to the self-locking functioning of the nut of my invention is the extrusion or wiping of the nut body material from the ribs by the engagement of the thread of the nut with said ribs. This extruded material is deposited in the spaces between the ribs and, depending upon the spacing of the ribs, will form compacted masses engaging the thread of the nut to serve as an additional locking factor in preventing relative rotation between the nut and the thread of the screw with which the nut is engaged.

Other objects and advantages of my invention will be apparent from the following specification and the accompanying drawing, which is for the purpose of illustration only, and in which:

FIG. 1 is an isometric view of a nut manufactured in accordance with the teachings of my invention;

FIG. 2 is a vertical, sectional view;

FIG. 3 is a development showing the rib pattern incorporated in the bore of the nut; and FIG. 4 is a fragmentary sectional view showing the incorporation in the nut of an integral seal.

Referring to the drawing, I show a nut 10 constructed in accordance with the teachings of my invention, said nut having a one-piece unitary body 12 formed from a suitable material which is sufficiently extrudable, deformable, soft and displaceable to permit the thread of a conventional screw to extrude or displace an adjacent portion of the nut when the conventional screw is disposed in operative relationship therewith.

Suitable materials for utilization in the body 12 of the nut include various types of synthetic plastics, such as nylon, and various types of readily extrudable, ductile metals such as aluminum, zinc, copper, and the like. The basic requisite for the material utilized in the nut body is that it be sufficiently extrudable to permit the thread of an associated screw to dislodge adjacent portions of the nut body and, yet, sufficiently resistant to displacement to permit the nut 10 to maintain its position on the thread of an associated screw when subjected to predetermined tensile loads.

Furthermore, while specific materials have been mentioned hereinabove, it is, of course, not intended to limit the teachings of this invention to the utilization of those particular materials, since equivalent materials having desirable physical characteristics may be utilized in substitution therefor in forming the body 12 of the nut 10.

The body 12 of the nut 10 is elongated and the upper portion thereof is polygonal in form to provide a plurality of wrenching surfaces 14 adapted to be engaged by a suitable tool to assist in threading the nut 10 upon an associated screw 16, which incorporates a thread 18. Since the nut 10 is self-tapping in nature, the screw 16 is a conventional screw and there is no necessity for providing relatively expensive self-tapping screws for utilization in conjunction with the nut 10.

The lower extremity of the body 12 of the nut 10 is cylindrical in configuration and the under surface thereof is adapted to serve as an integral face washer 22 for engagement with the contiguous surface of an object against which the nut 10 is juxtaposed. However, it should be understood that the teachings of the invention are not limited to the incorporation of a face washer as an integral part of the nut body 12, nor is it necessary that the polygonal surfaces be formed on the body 12 to accomplish the installation thereof upon the screw 16.

The outer surface of the face washer portion 22 of the nut 10 may incorporate an angular, integral seal 24 adapted to seal against the adjacent surface and to prevent the flow of fluid between said surface and the face washer 22. The nut 10 incorporates an elongated bore 30, said bore having a tapered entry or lead portion 31 which is formed, approximately, at an angle of 10° and which is adapted to facilitate the entry of the associated extremity of the screw 16 into the bore 30.

Formed on the wall of the bore 30 is a plurality of ribs 32 which have their longitudinal axes parallel to the longitudinal axis of the bore 30, and which have their lower extremities 34 spaced different distances from the lower extremity of the bore 30 to correspond, generally, with the pitch or lead angle of the thread 18 of the screw 16 which is to be inserted into the bore 30 and to engage the ribs 32, in a manner to be described in greater detail below.

The ribs 32 are all tapered symmetrically from the lower to the upper extremities thereof, and the faces of the ribs 32 also taper inwardly from the lower to the upper extremities thereof toward the longitudinal centerline or axis of the bore 30.

The surfaces of the ribs 32 define segments of a conjectural minor diameter which conforms to the minor diameter of the screw 16. If, for example, a 10–24 screw is utilized, this minor diameter is .156 inch. On the other hand, the major diameter of the bore wall 30 is .190 inch and conforms to the major diameters of the screw 16.

Of course, these exact major and minor diameters of the ribs 32 and the bore 30 exist only on the upper plane of the nut 10, since the draft requirement of a plastic, molded nut expands the diameters by and insignificant amount toward the mold parting line at the lower extremity of the nut, being 1 degree typical draft in the present embodiment of the invention.

Of course, the bore diameter experiences a further diametral increase in the last .031 inch dimension from the parting line, resulting from the 10° draft occasioned by the entry or lead portion 31 of the bore 30.

The lower extremities of the ribs 32 are located different distances from the lower extremity of the bore 30. The developmental view shown in FIG. 3 of the drawing illustrates the manner in which the ribs 32 are successively engaged by the thread 18 of the screw 16, and also illustrates the manner in which the lower extremities of the ribs 32 are disposed on a conjectural helical line 40 which corresponds to the lead angle of the thread 18 of the screw 16.

Since, in the case of the nut 10 illustrated, the four ribs 1–4 are spaced ¼ segment from each other on the wall of the bore 30, the rib 2 will terminate .01025 above the lower extremity of rib 1, rib 3 will have its lower extremity .0205 above the lower extremity of rib 1, and rib 4 will have its lower extremity .03075 above the lower extremity of rib 1.

By the time the conjectural helical line 40 has returned to the center line position of rib 1, it will lie 4 times .01025 or .041 above the lower extremity of rib 1, since this figure is the pitch or lead angle of the 10–24 nut size under consideration here. The ribs 5–8 have their lower extremities terminating on a continuation of the conjectural helical line 40 and since the line 40 has returned to rib 1 at .041 thread lead dimension, and since rib 5 is equally spaced from ribs 1 and 2 and located therebetween, rib 5 must terminate on the conjectural helical line 40 as follows, in relationship to the lower extremity of rib 1:

⅛ times thread lead+.041=rib 5 terminus dim. above rib 1 terminus.
.005+.041=.046 inch.

The lower extremity of rib 6 will be located .05625 above the lower extremity of rib 1, rib 7 will have its lower extremity .0665 above the lower extremity of rib 1, and rib 8 will have its lower extremity .07675 above the lower extremity of rib 1. It will be noted that each succeeding numbered rib's lower extremity lies .01025 above the previous numbered rib, with the exception of rib 5, whose lower extremity lies .01525 above the lower extremity of rib 4.

It will be readily apparent to those skilled in the art that the lower extremities of the ribs in nuts adapted for utilization in conjunction with screws having threads of larger or smaller lead angles will be displaced from each other at distances corresponding to the lead angles of the threads incorporated in said screws. Moreover, while I have disclosed a nut incorporating eight ribs 32, it will be obvious to one skilled in the art that the number of the ribs can be increased or decreased to meet specified design needs, and that the taper, width and depth of the ribs and the spacing thereof can be varied to conform to the exigencies of the design situation.

In applications where the nut 10 incorporates the lower seal 24, an upper seal ring 42 integral with the wall of the bore 30 is provided. The seal 42, as best shown in FIG. 4 of the drawing, connects the upper extremities of the ribs 32 and is engaged by the thread of the screw associated with the nut 10. Consequently, fluids will be prevented from leaking past the bottom surface of the nut 10 by the seal 24 and from the top of the nut 10 by the seal 42.

When a 10–24 screw is inserted into the 10–24 plastic nut 10, its upper extremity will be guided into concentricity with the bore 30 by the 10° draft provided in the lead portion 31 of the bore 30, so that the end of the screw thread 18 will engage the lower extremity of rib 1.

The screw 16 can now be rotated clockwise and the thread 18 will successively engage the lower extremities of ribs 2–4 as it rotates 270°. As the rotation continues to a point just in advance of the 360° point, the end of the screw thread 18 will engage the side of rib 1 at a position .041 inch above the lower extremity of rib 1.

Continued rotation of the screw 16 will cause the thread 18 to displace the plastic material of rib 1, which is easily accomplished because the rib taper results in minimum wall thickness at this point. Continued rotation of the screw 16 will cause similar displacement of the plastic material from the ribs 2–4, engagement of these ribs occurring at a point .041 inch above the rib's lower extremity in each instance.

When the screw 16 has been rotated sufficiently to engage the side wall of rib 5, the screw thread 18 will have fully tapped ribs 1–4 by one full thread lead. The screw 16 will then be ready to tap ribs 5–8. If the screw 16 does not exactly engage the lower extremity of rib 1 at the initiation of rotation in the bore 30, the consequence will be that the screw 16 will rotate by any lesser amount than 360° before coming into contact with the side wall of rib 1.

One of the important aspects of my invention is that the initial torque required to rotate the screw 16 in the bore 30 is much less than that entailed in the subsequent rotation of the screw 16. As a result, initial engagement of the nut 10 by the screw 16 can be made by hand if desired but, in production use, it is contemplated that a tool or air-actuated driver will be utilized either from the initiation of screw penetration or to seat the nut to initial hand engagement.

As the rotation of the screw 16 continues, the thread 18 thereof successively engages the successively wider portions of the ribs 32 with a consequently greater amount of material extruded or displaced from the ribs by the thread 18 and a resultantly greater engagement of the ribs 32 by the thread 18. The plastic material displaced or extruded from the ribs 32 is accommodated in the spaces between the ribs. The taper of the ribs in both width, circumferentially of the bore 30, and in thickness, radially of the bore 30, from the lower to the upper extremities of said bore 30 permits a progressively thicker rib to be achieved from the lower to the upper extremity of the rib, thus providing for considerable design freedom to attain the desired resistance to tensile stress.

Because the thread 18 will displace or extrude from the ribs 32 an amount of material exactly equal to the dimension of the thread 18, there will be no play between the screw 16 and the nut 10. Moreover, the displaced material will tend to engage the adjacent surfaces of the thread 18 in frictional contact, increasing the self-locking operation of the nut 10.

The sealing rings 24 and 42 are intended to seal the shank of the screw 16 against leakage. In the size nut being considered here, the sealing ring 42 is approximately .020 in height and, as the screw 16 is rotated through the upper extremity of the bore 30, the thread 18 displaces the plastic material to form a continuous seal.

The sealing ring 42 may also be considered in the light of an abruptly increased taper of the ribs 32 at their upper extremities, which eliminates the spaces between the ribs 32. As the screw 16 is driven, the displaced material will completely seal any spaces remaining between the ribs.

The sealing ring 24 is a thin, tapered concentric rib projecting approximately .010 inch from the lower or underside surface of the nut 10. As the nut 10 is seated, the ring 24 will be crushed against the face of the adjacent surface. Therefore, any fluid leakage will be contained between the seals 24 and 42.

I therefore provide by my invention a nut which is characterized by the fact that, while self-tapping, it is not necessary to utilize in conjunction therewith the conventional, relatively expensive self-tapping screws. Moreover, the nut can be fabricated as a completely finished one-piece unit incorporating self-locking, self-tapping and self-sealing features without the necessity for the performance of subsequent manufacturing operations thereupon.

The nut of my invention can be fabricated in large quantities at low cost by conventional plastic injection molding procedures but, of course, it is not intended that the teachings of my invention be limited to the specific plastic materials disclosed herein since, as previously indicated, a wide variety of metallic substances of high ductility and extrudability is available for utilization in substitution for synthetic plastcs, such as the nylon plastic previously mentioned hereinabove.

Although my invention has been herein shown and described in what is conceived to be the most practical and preferred embodiment thereof, it is recognized that departures may be made therefrom within the scope of the invention, which is not to be limited to the details disclosed herein, but is to be accorded the full scope of the claims so as to embrace any and all equivalent structures and devices.

I claim:

1. A self-locking nut, including, an elongated body having a correspondingly elongated bore therein, said bore having a plurality of radially inwardly and axially extending ribs formed in the wall thereof, the lower extremities of said ribs terminating at progressively greater distances from the lower extremity of said body to define a predetermined pitch angle and intermittent portions of an imaginary thread pattern, at least said ribs being formed of a ductile material.

2. A self-locking nut, including, a body having an elongated bore therein, said bore having a plurality of radially inwardly and axially extending ribs formed therein which have their lower extremities terminating on a predetermined lead angle of an imaginary thread pattern and taper upwardly from a lesser to a greater circumferential width, at least said ribs being formed of a ductile material.

3. A self-locking nut, including, a body having an elongated bore therein, said bore having a plurality of radially inwardly and axially extending ribs formed therein which have their lower extremities terminating on a predetermined lead angle of an imaginary thread pattern and taper upwardly from a lesser to a greater circumferential width, said ribs also tapering progressively inwardly from the lower to the upper extremities thereof to define a major diameter therebetween adjacent the lower extremities thereof and a minor diameter at the upper extremities thereof, at least said ribs being formed of a ductile material.

4. A self-locking nut, including, a body formed from deformable material, said body having a centrally located bore therein and the wall of said bore incorporating a plurality of axially extending, inwardly directed deformable material ribs disposed in circumferentially spaced relationship with one another, said ribs having their lower extremities terminating at different distances from the lower extremity of said bore to define a predetermined lead angle of an imaginary thread pattern, whereby the thread of a fastener inserted in said bore will successively engage the lower extremities of said ribs and dislodge the material of said ribs into the spaces between said ribs to form a thread pattern in said ribs conforming to the lead angle of the thread of said fastener.

5. A self-locking nut, including, a body formed from deformable material, said body having a centrally located bore therein and the wall of said bore incorporating a plurality of axially extending, inwardly directed deformable material ribs disposed in circumferentially spaced relationship with one another, said ribs having their lower extremities terminating at different distances from the lower extremity of said bore to define a predetermined lead angle of an imaginary thread pattern, whereby the thread of a fastener inserted in said bore will successively engage the lower extremities of said ribs and dislodge the material of said ribs into the spaces between said ribs to form a thread pattern in said ribs conforming to the lead angle of the thread of said fastener, said ribs being progressively circumferentially wider from the lower to the upper extremities thereof.

6. A self-locking nut, including, a body formed from deformable material, said body having a centrally located bore therein and the wall of said bore incorporating a plurality of axially extending, inwardly directed deformable material ribs disposed in circumferentially spaced relationship with one another, said ribs having their lower extremities terminating at different distances from the lower extremity of said bore to define a predetermined lead angle of an imaginary thread pattern, whereby the thread of a fastener inserted in said bore will successively engage the lower extremities of said ribs and dislodge the material of said ribs into the spaces between said ribs to form a thread pattern in said ribs conforming to the lead angle of the thread of said fastener, said ribs tapering inwardly toward the central axis of said bore progressively from the lower to the upper extremities thereof to define a major diameter between said lower extremities and a minor diameter between said upper extremities.

7. A nut having an elongated body incorporating an elongated bore, said bore having a radially tapered lead portion at its lower extremity and incorporating a plurality of axially extending, radially inwardly directed, circumferentially spaced thread-engaging ribs, said ribs terminating at different distances from the lower extremity of said bore to define at least two revolutions of a lead angle of an imaginary thread corresponding to the lead angle of the thread of the fastener cooperating with said nut, at least said ribs being formed of a ductile material.

8. A nut having an elongated body incorporating an elongated bore, said bore having a radially tapered lead portion at its lower extremity and incorporating a plurality of axially extending, radially inwardly directed, circumferentially spaced thread-engaging ribs, said ribs terminating at different distances from the lower extremity of said bore to define a lead angle of an imaginary thread corresponding to the lead angle of the thread of the fastener cooperating with said nut, said body having a washer portion formed integrally therewith at the lower extremity thereof, an annular sealing portion projecting axially from a lower face of said washer portion, at least said ribs being formed of a ductile material.

References Cited

UNITED STATES PATENTS

| | | | |
|---|---|---|---|
| 1,248,004 | 11/1917 | Pleister | 85—83 |
| 2,632,479 | 3/1953 | Pfeil et al. | 85—32 |

FOREIGN PATENTS

| | | |
|---|---|---|
| 696,434 | 10/1930 | France. |
| 1,028,629 | 2/1953 | France. |
| 276,348 | 2/1928 | Great Britain. |

CARL W. TOMLIN, *Primary Examiner.*

R. S. BRITTS, G. A. MILWICK, *Assistant Examiners.*